UNITED STATES PATENT OFFICE.

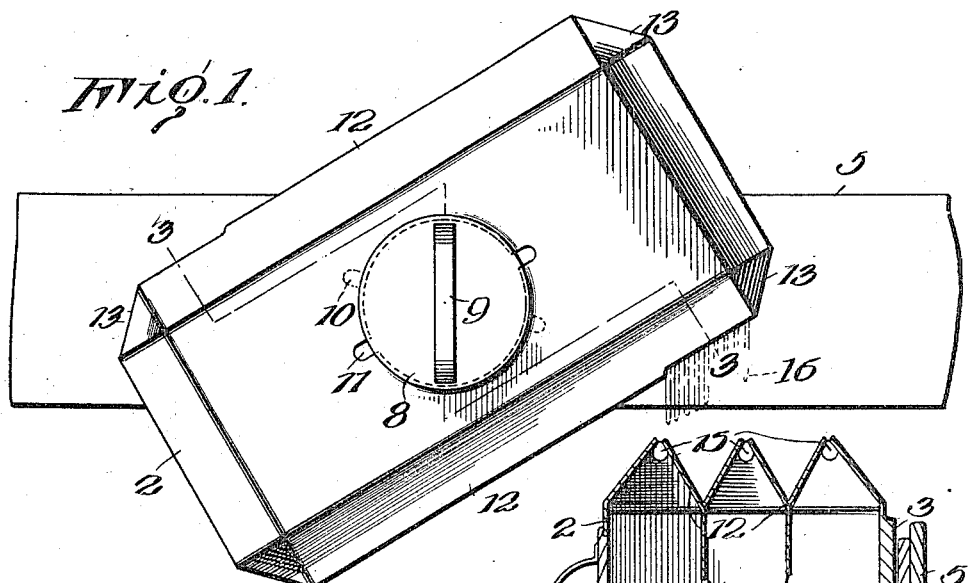

HERMAN E. DE PEW, OF FRESNO, CALIFORNIA.

NAIL-DISPENSING CONTAINER.

1,209,681.  Specification of Letters Patent.  Patented Dec. 26, 1916.

Application filed June 27, 1916. Serial No. 106,224.

*To all whom it may concern:*

Be it known that I, HERMAN E. DE PEW, a citizen of the United States, and resident of Fresno, in the county of Fresno and State of California, have invented certain new and useful Improvements in Nail-Dispensing Containers, of which the following is a specification.

The present invention relates to new and useful improvements in dispensing containers and has particular reference to an improved type of nail and tack container for use by shinglers and the like, the container being carried by the user.

The primary object of my invention is to provide a container of the class described which upon actuation by the user serves to automatically dispense nails, tacks, and the like without danger of loss of the contents.

Another object of my invention is to provide a dispensing device of the class described in which the articles contained therein are exposed to be grasped by the user and withdrawn from the container.

A further object of my invention is to provide a dispensing device of the character described which is simple in construction, cheap to manufacture, strong and durable, and effective in operation.

Other objects and advantages to be derived from the use of my improved dispensing container will appear from the following detail description and the claims, taken with an inspection of the accompanying drawing, in which:

Figure 1 is a front elevational view of a container embodying the improvements of my invention; Fig. 2 is a bottom plan of the same; and Fig. 3 is a transverse sectional view taken on the line 3—3 of Fig. 1.

Referring more particularly to the drawing, wherein similar characters of reference designate like and corresponding parts throughout the various views, 1 designates in its entirety the dispensing device of my invention, the same having side walls 2 and 3 and end walls 4. The device is mounted on a belt 5 or the like which is adapted to encircle the waist or chest of the user, a trunnion 6 extending through said belt and side wall 3 of the device for rotatively supporting the latter. The front wall 2 is provided with an opening closed by a closure member 8 having a handle 9 thereon. A plurality of tongues 10 extend from the closure member 8 and are adapted to engage through recesses 11 formed adjacent the opening in the wall 2, whereby insertion and removal of the closure member is facilitated.

The top and bottom walls of the body 1 are formed with a plurality of parallel V-shaped channel members 12. From another viewpoint, these walls are channeled. The ends of the channel members are beveled as at 13. The outlet means for the container 1 includes a plurality of slots 14 formed in the top and bottom walls at the outer vertices of the parallel V-shaped channel members, said openings being arranged at diagonally opposite corners of the body and extending inwardly from said corners for a relatively short distance. The outer end of each opening 14 is provided with an enlarged portion 15 for a purpose which will hereinafter appear.

The articles to be dispensed are designated 16, the same being shown as nails in Fig. 3. In use, the closure member 8 is removed and the container partly filled with nails, or tacks or some similar class of articles. When the container is partly filled the same will normally assume the position shown in Fig. 1, the weight of the contents balancing the weight of the free end of the device. To dispense the articles the body 1 is tilted until a few of the nails, or tacks, as the case may be, project beyond the openings 14, the heads of the articles preventing their complete exit. The body is now allowed to return to normal position and the nails will be as shown in Fig. 1. To remove the nails the same are merely slid longitudinally, the heads passing through the enlarged openings 15. The operation is repeated at the diagonally opposite corner of the container upon a reverse rotation of the device.

In order that the articles being dispensed may not lie transversely of the channels I provide a plurality of interior parallel flanges 18 integrally carried by the top and bottom walls of the body.

The strap 5 is to be encircled about the chest or waist of the user so that the receptacle is always in a convenient position for reach.

It will be noted that the device always returns automatically to the position shown in Fig. 1, by gravity, thus preventing the remaining contents of the receptacle from interfering with the withdrawal of the exposed contents.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:

1. A dispensing container of the class described, including a body having side and end walls, and top and bottom walls, said top and bottom walls being provided with a plurality of parallel V-shaped channel members, said members being provided at their vertices with outlet openings.

2. In a dispensing container for nails and the like, a body having side and end walls, and top and bottom walls, said top and bottom walls having parallel V-shaped channel members, said members having outlet openings, and a supporting member providing means for rotatably mounting the said container.

3. A dispensing container of the class described, including a body having channeled top and bottom walls, and having side walls, said body being rotatably supported, said channels having elongated outlet openings associated therewith, and a removable closure member in one side wall of said body for the purpose specified.

4. In a dispensing container of the class described, a body having channeled top and bottom walls, the channels in each wall being V-shaped in cross section and each having an outlet opening in its vertex at one end thereof, the outlet openings in the channels of one wall being diagonally opposite those in the channels of the other wall, said body being rotatably supported, and an inlet through which said body may be filled.

5. A dispensing container of the class described, including a body having channeled top and bottom walls, and having side walls, the channels in each wall being V-shaped in cross section and each having an outlet opening in its vertex at one end thereof, the outlet openings in the channels of one wall being diagonally opposite those in the channels of the other wall, one side wall of said body having an opening therein, and a closure for said opening.

6. A dispensing container of the class described, including a body, the top and bottom walls thereof being provided with channels V-shaped in cross-section, said channels having elongated outlet openings formed at their vertices, said openings being provided with enlarged end portions, means for rotatably supporting the body, and an inlet through which said body may be filled.

In testimony whereof, I affix my signature hereto.

HERMAN E. DE PEW.

Copies of this patent may be obtained for five cents each, by addressing the "Commissioner of Patents, Washington, D. C."